Feb. 24, 1970   H. L. DOBRIKIN   3,497,268
TRAILER BRAKE FILL SYSTEM
Filed Oct. 7, 1968

INVENTOR.
Harold L. Dobrikin
BY Parker, Carter & Markey
Attorneys.

United States Patent Office 3,497,268
Patented Feb. 24, 1970

1

3,497,268
TRAILER BRAKE FILL SYSTEM
Harold L. Dobrikin, Highland Park, Ill., assignor to Berg Mfg. & Sales Co., Des Plaines, Ill., a corporation of Illinois
Filed Oct. 7, 1968, Ser. No. 765,585
Int. Cl. B60t 7/20, 13/74
U.S. Cl. 303—7     3 Claims

ABSTRACT OF THE DISCLOSURE

In one form of the invention electrical energy delivered to a trailer stoplight opens a solenoid valve to deliver fluid pressure directly from the trailer tank to fill the trailer brake system up to a predetermined pressure level at which level a pressure-operated switch, connected in series with the stoplight and solenoid valve, is effective to close the solenoid valve and to limit the amount of pressure delivered to the trailer brake system. In a second version of the invention a second, smaller auxiliary trailer tank is provided. A normally open solenoid valve is placed between the main trailer tank and the auxiliary trailer tank and a normally closed solenoid valve is placed between the auxiliary tank and the trailer brake system. The solenoid valves are actuated in response to delivery of electrical energy to the trailer stoplight.

---

This invention relates to trailer brake systems and has for one purpose a means and assembly effective to fill a trailer brake system to a predetermined level prior to the time required for said filling by pressure and in response to application of brakes by the vehicle operator.

The time required for service brake pressure to reach the trailer brake system for actuation of a relay valve to fill said system produces a delay between actual brake application of the tractor and trailer. Delayed trailer brake application creates a tendency toward jackknifing. Accordingly, it is a purpose of the invention to provide a simple, automatic means of reducing said tendency by reducing said delay.

Another purpose is to provide a trailer brake system of maximum economy in manufacture and use.

Another purpose is to provide a trailer brake fill system usable with varying types of tractors.

Another purpose is to provide a trailer brake system incorporating means filling said system in response to delivery of electrical energy to the trailer stoplight.

Other purposes may appear from time to time during the course of the specification and claims.

Brief description of the drawings

The invention is illustrated more or less diagrammatically in the accompanying drawings wherein.

Like parts are indicated by like numerals throughout the specification and drawings.

DESCRIPTION OF THE PREFERRED EMBODIMENT

Figure 1:
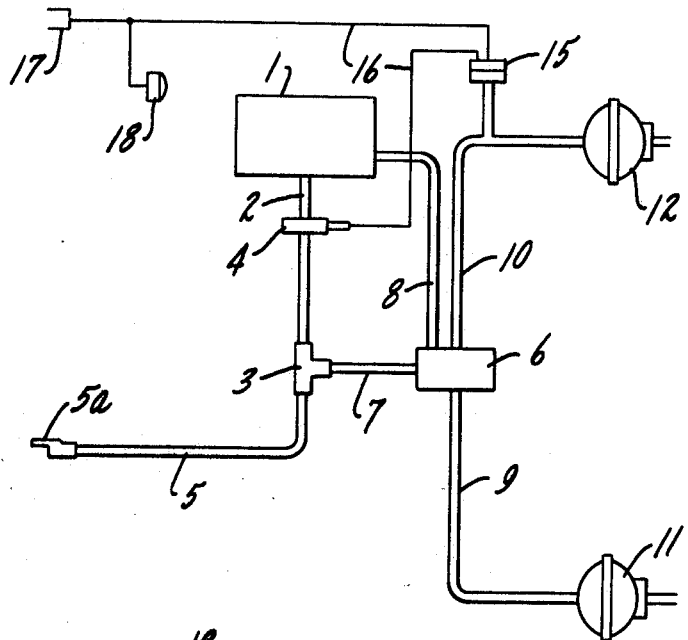
FIGURE 1 is an over-all view of one form of the invention.

Referring now to the drawings, and particularly to FIGURE 1, the numeral 1 generally designates a trailer tank or reservoir of fluid pressure. A conduit 2 communicates the trailer tank 1 with a two-way check valve 3. In the conduit 2 between the tank 1 and check valve 3 is an electrically operated valve, such as solenoid valve 4.

2

Indicated at 5 is a service pressure conduit communicating with the opposite inlet of two-way check valve 3. The valve 3 communicates with relay emergency valve 6 through conduit 7.

As is well known, relay valve 6 is supplied with fluid pressure from the tank 1, as for example by conduit 8, and said pressure is delivered from valve 6 through suitable conduits 9, 10 to trailer brake operating chambers such as those shown, respectively, at 11, 12. Communicating with at least one of the conduits 9, 10 is a pressure-responsive switch 15 connected, as by electrical conductor 16, to valve 4 and to the electrical connector 17. A stoplight 18 is connected to conductor 16. It will be understood that connector 17 is provided for connection with a cooperating connector (not shown) on the tractor and a gladhand 5a is provided for connection with a cooperating gladhand (not shown) of the tractor, all in accordance with standard practice.

Figure 2:
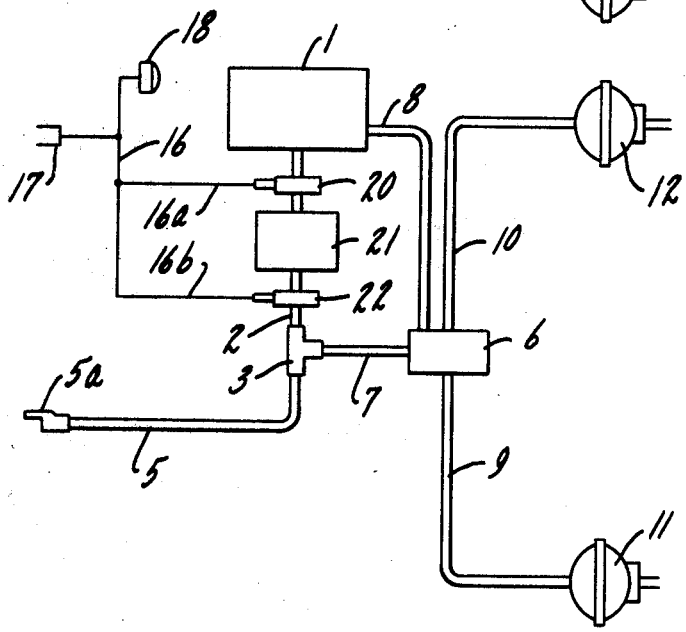
FIGURE 2 is an over-all view of another form of the invention.

Referring now to FIGURE 2, it will be observed that parts corresponding to those illustrated in FIGURE 1 are, for clarity, provided with the same numerals. In the form of the invention illustrated in FIGURE 2, however, a conduit 2 has connected therein a first solenoid valve 20, an auxiliary pressure reservoir or tank 21 and a second solenoid valve 22.

It will be observed that the conductor 16 includes a branch conductor 16a communicating with electrically operated valve 20 and the remainder of conduit 16, as indicated at 16b, connects with electrically operated valve 22, the valve 20 being a normally-open solenoid valve and the valve 22 being a normally-closed solenoid valve.

The use and operation of the invention are as follows:

As is well known, an actuation of the brake pedal (not shown) by the vehicle operator in the tractor operates the tractor-mounted application valve (not shown) to direct fluid pressure to the tractor brakes and through gladhand 5a to valve 6 to actuate valve 6 for transmission of fluid pressure from tank 1 through conduit 8, valve 6 and conduits 9, 10 to trailer brake chambers 11 and 12.

It will be understood that a stoplight switch (not shown) is responsive to fluid pressure immediately downstream of the tractor application valve to produce delivery of electrical energy to connector 17. In the form of FIGURE 1, electrical energy delivered at connector 17 illuminates, through the conductor 16, the stoplight 18 and opens the electrically operated valve 4 to provide delivery of fluid pressure from tank 1 through two-way check valve 3 to relay emergency valve 6, triggering the emergency valve 6 to supply pressure from tank 1 and conduit 8 to fill the system 9–12 to a predetermined level. If, for example, said level be preset at 10 pounds, the presence of pressure at said level in the trailer brake system is effective to actuate pressure switch 15 and to break the circuit in conductor 16 downstream of stoplight 18. At this point, the normally closed solenoid valve 4 will close and preclude the delivery of further pressure to the trailer brake system. At about this time the service pressure line 5 will have been filled as a result of the actuation of the tractor and brake application valve above described.

Thus the trailer brake system will have been filled with sufficient fluid pressure to enable the operation of the trailer brakes substantially simultaneously with operation of the tractor brakes and reduce the tendency of the trailer brakes to be applied after application of the tractor brakes and thus to reduce the tendency toward jackknifing.

Referring now to the form of the invention in FIGURE 2, the above described actuation of the tractor brake pedal and tractor brake application valve produces the same substantially immediate delivery of electrical energy to connector 17 to illuminate the stoplight 18 and to supply electrical energy to electrically operated valves 20, 22.

It will be understood that the tractor reservoir or tank 1 is maintained at a substantial predetermined pressure. The pressure in auxiliary tank 21 will normally be less than that in tank 1. Delivery of electrical energy to the normally open valve 20 causes it to close and seals tank 1 against further delivery of pressure to tank 2. Said delivery of electrical energy through conductor 16 simultaneously opens the normally closed valve 22 and permits the pressure within tank 21 to flow through check valve 3 to relay emergency valve 6 and thus to produce delivery of fluid pressure from the tank 1 through conduits 8, 9, and 10 to chambers 11 and 12.

When the pressure from tank 21 flows through the conduits connecting it to valve 6 and through valve 22 and valve 3 and into the area above the service piston (not shown) in relay emergency valve 6, said pressure within tank 21 is reduced as a result of its flow into the increased volume represented by said elements between the tank 21 and the service piston in valve 6.

It will be understood that the pressure within tank 21 is set at a predetermined amount in relation to said increased volume in order to insure that a predetermined limited amount of fluid pressure is delivered from tank 1 to the brake system represented by the elements 9–12, inclusive. Thus the trailer brake system will be filled to a predetermined limited amount and will be prepared for the immediately impending delivery of service pressure through line 5 as a result of the operation of the tractor brake application valve in known manner. Arrival of superior service pressure at valve 3 actuates valve 3 to enable said pressure to flow to valve 6, as is known.

Upon release of the tractor brake pedal by the vehicle operator, electrical energy will no longer be supplied to connector 17, stoplight 18, conductors 16, 16a, 16b and valves 20, 22. At that point valve 22 will close and valve 20 will open to again fill tank 21 and prepare the system for the next actuation of the system.

While the electrical conductor to stoplight 18 provides a ready and convenient source of electrical energy, it will be realized that other suitable sources responsive to tractor brake pedal actuation may be used. Similarly, elements shown separately may be combined in a single housing without departing from the nature and scope of the invention.

The embodiments of the invention in which an exclusive property or privilege is claimed are defined as follows:

1. For use in a trailer brake system having a reservoir of fluid pressure, a two-way check valve, a service line communicating with one inlet of said check valve, a relay emergency valve, a conduit connecting the outlet of said two-way check valve with the service side of said relay emergency valve, a second conduit communicating said reservoir with said relay emergency valve, a plurality of brake-operating chambers and brake lines communicating said relay emergency valve with said brake chambers, a trailer brake fill system including a conduit communicating said reservoir with a second inlet in said two-way check valve, an electrically operated valve in said last-named conduit, an electrical conductor connecting said stoplight and said electrically operated valve whereby said electrically operated valve is actuated in response to delivery of electrical energy to said stoplight, a second reservoir downstream of said electrically operated valve, a second electrically operated valve downstream of said second reservoir and upstream of said two-way check valve, said first electrically operated valve being normally open, said second electrically operated valve being normally closed, said first and second electrically operated valves being electrically connected to said stoplight and actuated in response to delivery of electrical energy to said stoplight.

2. In combination with a trailer system having a stoplight and a source of fluid pressure, an electrically operated valve controlling delivery of pressure from said source to said system, said electrically operated valve being activated in response to delivery of electrical energy to said stoplight, a second source of fluid pressure between said electrically operated valve and said system and a second electrically operated valve actuatable in response to said delivery of electrical energy to said stoplight and positioned between said second source and said system, said first valve being normally open, said second valve being normally closed.

3. For use in a tractor-trailer combination vehicle, means for filling the brake system of the trailer having a source of fluid pressure and a relay valve, said means including a conduit connecting said source to the service side of said relay valve, an electrically operated valve controlling said conduit, means connected to said electrically operated valve to supply electrical energy thereto in response to actuation of the tractor brake system, a second source of fluid pressure of predetermined level downstream of said electrically operated valve, a second electrically operated valve downstream of said second source, said first electrically operated valve being normally open, said second electrically operated valve being normally closed, said electrical energy supply means being connected to said second electrically operated valve for simultaneous supply of electrical energy to said first and second electrically operated valves.

References Cited
UNITED STATES PATENTS

| | | | |
|---|---|---|---|
| 2,571,885 | 10/1951 | Ingres | 303—8 |
| 3,010,768 | 11/1961 | Obrin | 303—7 |
| 3,117,822 | 1/1964 | Blair | 303—7 |
| 3,232,674 | 2/1966 | Stelzer | 303—7 |
| 3,428,368 | 2/1969 | Kobnick | 303—7 |

MILTON BUCHLER, Primary Examiner

JOHN J. McLAUGHLIN, Jr., Assistant Examiner

U.S. Cl. X.R.

188—3; 303—3, 15